US008718554B2

(12) United States Patent
Abel

(10) Patent No.: US 8,718,554 B2
(45) Date of Patent: May 6, 2014

(54) MEANS FOR PROVISIONING AND MANAGING MOBILE DEVICE CONFIGURATION OVER A NEAR-FIELD COMMUNICATION LINK

(75) Inventor: Miller T. Abel, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 11/354,508

(22) Filed: Feb. 15, 2006

(65) Prior Publication Data

US 2007/0190939 A1    Aug. 16, 2007

(51) Int. Cl.
*H04B 7/00* (2006.01)
*H04B 5/00* (2006.01)

(52) U.S. Cl.
USPC ........ 455/41.2; 455/41.1; 455/41.3; 455/507; 455/509; 455/66.1

(58) Field of Classification Search
USPC .............. 455/41.1, 41.2, 41.3, 507, 509, 66.1
See application file for complete search history.

(56) References Cited

U.S. PATENT DOCUMENTS

| 7,106,175 | B2 * | 9/2006 | Lewis ........................ 340/10.34 |
| 7,319,843 | B2 * | 1/2008 | Kahlman et al. ............. 455/41.1 |
| 7,349,666 | B2 * | 3/2008 | Yamamoto ................... 455/41.1 |
| 7,366,806 | B2 * | 4/2008 | Milenkovic et al. ............ 710/62 |
| 7,386,275 | B2 * | 6/2008 | Pirzada et al. ............... 455/41.2 |
| 7,412,224 | B2 * | 8/2008 | Kotola et al. ............... 455/41.2 |
| 7,643,798 | B2 * | 1/2010 | Ljung ........................ 455/41.3 |
| 7,697,894 | B2 * | 4/2010 | Zilliacus et al. ............. 455/41.2 |
| 8,068,784 | B2 * | 11/2011 | Takayama et al. ........... 455/41.2 |
| 2003/0114104 | A1 * | 6/2003 | Want et al. ...................... 455/39 |
| 2004/0063402 | A1 * | 4/2004 | Takeda et al. ................ 455/41.1 |
| 2004/0185777 | A1 * | 9/2004 | Bryson ........................ 455/41.1 |
| 2004/0203590 | A1 * | 10/2004 | Shteyn ........................ 455/41.1 |
| 2005/0064814 | A1 * | 3/2005 | Matsuo et al. ............... 455/41.1 |
| 2007/0136205 | A1 * | 6/2007 | Przybilla ......................... 705/54 |
| 2007/0145135 | A1 * | 6/2007 | Jogand-Coulomb et al. .. 235/451 |
| 2007/0236350 | A1 * | 10/2007 | Nystrom et al. ........... 340/572.1 |
| 2008/0046985 | A1 * | 2/2008 | Lenoir et al. ...................... 726/6 |
| 2009/0144815 | A1 * | 6/2009 | Vrielink et al. ................... 726/7 |

OTHER PUBLICATIONS

"Welcome to Ecma International" http://www.ecma-international.org/ last viewed Feb. 14, 2006, 1 page.
"NFC Forum-Home" http://www.nfc-forum.org/home last viewed Feb. 14, 2006, 2 pages.
ECMA International "Near Field Communication White Paper" (2004) 9 pages.

(Continued)

*Primary Examiner* — Wen Huang
(74) *Attorney, Agent, or Firm* — Judy Yee; Micky Minhas

(57) ABSTRACT

A device provisioning and/or configuration system and method are provided. The system employs a near field communication (NFC) channel in an active and/or passive mode as a channel for provisioning and/or managing mobile device (s) (e.g., with content and/or setting(s)) by a server. The device can be any device that can employ a near field communication channel (e.g., phone, cellular communication device, portable digital assistant (PDA), handheld game console, media player . . . ).

The system provides a mechanism for pushing device configuration and/or service indicator(s), for example, through a point-of-sale and/or point-of-service. Significantly, the system utilizes NFC which facilitates selectivity to ensure that only the target device is configured. The NFC-capable device thus exposes its management interface(s) across the NFC channel. Additionally, device(s) can be in factory-configured state without general connectivity (e.g., no WLAN or mobile data service yet).

17 Claims, 7 Drawing Sheets

(56) References Cited

OTHER PUBLICATIONS

ECMA International "Near Field Communication interface and Protocol (NFCIP-1)" 2nd edition (Dec. 2004) 54 pages.
"Nokia-Service Discovery" http://www.nokia.com/link?cid=EDITORIAL_2024 last viewed Feb. 15, 2006, 1 page.
"Philips Semiconductors—Near Field Communication" http://www.semiconductors.philips.com/semiconductors/near-field-communication.php last viewed Feb. 15, 2006, 1 page.
"Near Field Communication" Sony Corporation http://www.ecma-international.org/activities/Communications/TC32tg19_110603.old.pdf last viewed Feb. 15, 2006, 7 pages.

* cited by examiner

MEANS FOR PROVISIONING AND MANAGING MOBILE DEVICE CONFIGURATION OVER A NEAR-FIELD COMMUNICATION LINK

BACKGROUND

The electronic industry has vastly improved upon providing a range or degree of freedom associated with employment of wireless networks and/or devices. Wireless networks and/or devices such as, but not limited to, wireless local area networks (WLAN), Bluetooth, local area network (LAN), sub-networks (e.g., wireless mouse and personal computer), portable digital assistants (PDA's), mice, keyboards, speakers, monitors, routers, phones, cellular communication devices, wireless devices, access points, hubs, . . . facilitate functionality with mitigation of wires and accompanied restrictions. In addition to providing degree(s) of freedom, wireless devices and/or networks are advantageous to hard-wired networks and/or devices for numerous reasons.

Traditional Wireless Application Protocol (WAP) Push Service Indication/Service Loading uses the GSM Short-Message Service. Since SMS requires prior identification of the device, it prevents unsolicited push of service indicators or service loading. Further, use of SMS as a push data bearer assumes a device with a GSM radio, active service account with phone number assigned, and access by the server to the SMS-C (SMS Center) gateway. SMS is also a measured-rate service to all but the subscriber's mobile operator.

There are existing alternatives to SMS that can be used to push data to a mobile device. Existing device management solutions utilize these modalities including SMS, IrDA, Bluetooth, and HTTP. But these solutions suffer when applied to point-of-sale, point-of-service applications:

SMS requires a GSM radio and is mobile operator specific.
IrDA is line-of-sight—specific orientation of receiver is required.
IrDA often requires device setup to receive beams.
HTTP requires an active network connection to at least a WLAN. For this to be available, substantial configuration must have already occurred; security requirements for Internet connections, including firewall and NAT limitations, prevent server-activated sessions—end-user interaction most-likely required.
HTTP sessions often carry over the global Internet—discoverability and addressability of the correct local resource (e.g. this kiosk, not the one next door or one in the next county) is problematic.
Browser-based user-initiated sessions are problematic for small form-factor mobile devices.
Bluetooth range is up to 30 feet which makes it less selective for kiosk-type applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A device provisioning and/or configuration system and method are provided. The system employs a near field communication (NFC) channel in an active and/or passive mode as a channel for provisioning and/or managing mobile device(s) (e.g., with content and/or setting(s)) by a server. The device can be any device that can employ a near field communication channel (e.g., phone, cellular communication device, portable digital assistant (PDA), handheld game console, media player . . . ).

The system provides a mechanism for pushing device configuration and/or service indicator(s), for example, through a point-of-sale and/or point-of-service. Significantly, the system utilizes NFC which facilitates selectivity to ensure that only the target device is configured. The NFC-capable device thus exposes its management interface(s) across the NFC channel. Additionally, device(s) can be in factory-configured state without general connectivity (e.g., no WLAN or mobile data service yet).

NFC technology permits wireless communication between devices across a narrow distance of 1 meter down to 2 centimeters or less. The air link and protocols are similar to those used by contactless smart cards and RFID, though there are differences in practice at multiple layers in the architecture.

The server and the device can each include an antenna and a transceiver (including RF circuitry) (e.g., that comply with the ISO/IEC 18092:2004 standard). When the device and the server (e.g., NFC node) are brought within range, the server data can be read by the device. Alternatively, the device can act as a node while a server discovers and reads/transmits data to the server.

The system employs the NFC channel as a device management and/or provisioning interface for mobile device(s). NFC has several notable advantages as a bearer of over-the-air provisioning and/or device management when compared to conventional system(s). NFC has selectivity ranging from one meter down to a couple of centimeters and does not require prior knowledge of a specific device address. Further, NFC does not require a line of sight (as IRDA does), in fact, NFC can work through clothing and/or retail packaging. With NFC, device discovery and detection is through broadcast and response, but within short-range, unlike Bluetooth whose range is up to thirty feet. The NFC channel is local, thus, the device is not exposed to general Internet or intranet traffic. The NFC channel employs an unlicensed frequency spectrum and thus is not burdened by access fees. Finally, NFC is suitable for (e.g., designed for) use in a production line environment. Accordingly, the fast association times and collision detection and avoidance features of NFC are ideal for in-factory configuration and customization of device(s).

An additional benefit of the NFC channel is that it is designed for ultra-low power operation and can remain passive until in the presence of a reader. As noted above, NFC has local selectivity as it's range is limited to less than one meter. Additionally, NFC uses a low-cost device antenna system that can be integrated (e.g., directly) into paper and plastic packaging.

As noted previously, the NFC channel can be employed in active and/or passive mode as a channel for provisioning and/or managing mobile device(s). With respect to the passive mode, the server, as initiator, generates an RF field which permits the NFC circuitry of the device to power itself from the RF field and to accept small amounts of data without main power applied (e.g., without a battery or other power source).

The passive mode can be used, for example, to provision device(s) and/or extract device capability document(s) while power is not applied and/or a power source (e.g., batter) is removed. For example, with the device in passive mode, the NFC channel can be employed to trigger a power-on or wake to permit dispatch of an NFC event that occurs while the device is in the "off" state.

In the un-powered or passive mode, provisioning files can be received during the passive state and can be buffered. When power is applied, the buffer can be inspected and any valid and authorized content and/or setting(s) can be retrieved and applied to the device. For example, this content and related settings can take the form of a URL which points to the content (e.g., either in the device's ROM, the device's file system and/or somewhere external to the device such as the Internet). In another example, the content and related settings can take the form of a data archive package (e.g., a CAB, ZIP and/or JAR file). Content over the NFC channel can be in a standardized format and/or in a proprietary format.

With "active mode" (also referred to as "powered" or "non-passive"), the NFC circuitry appears to the embedded operating system as another communication channel on which layered protocols can be exposed through existing service elements in the device. For example, NFC can be exposed as a physical network interface, a TCP/IP interface, OBEX endpoint, SOAP endpoint, SyncML client or server, FTP client or server, and/or other data communication protocol endpoint.

The system can employ the NFC channel in the active and/or passive mode as a channel for provisioning the mobile device (e.g., with content and/or setting(s). The system can utilize the NFC channel, in combination with other standardized and/or proprietary service elements, to expose these communication endpoints through a "touch target" by simply aligning the device with another NFC-capable device (e.g., server) that supports compatible communication protocols. and/or managing device To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
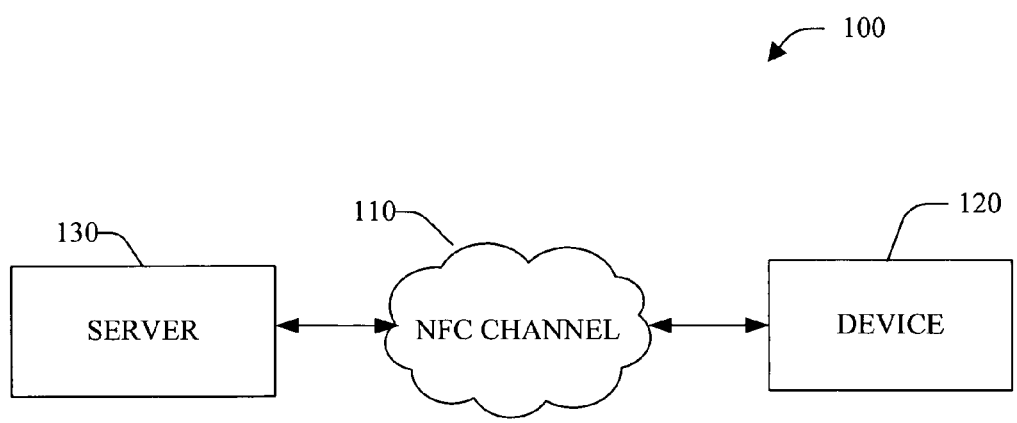
FIG. 1 is a block diagram of a device configuration system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, a device configuration system 100 is illustrated. The system 100 employs a near field communication (NFC) channel 110 in an active and/or passive mode as a channel for provisioning and/or managing mobile device(s) 120 (e.g., with content and/or setting(s)). The device 120 can be any device that can employ a near field communication channel 110 (e.g., a computer, a network, wireless keyboard, speaker, mouse, monitor, headset, headphones, remote, router, access point, printer, hard drive, modem, microphone, phone, cellular communication device, portable digital assistant (PDA), handheld game console, media player . . . ).

Optionally, in addition to NFC capabilities, the device 120 can have other wireless data transmission capability(ies) (e.g., mobile cellular data, third generation (3G), General Packet Radio Service (GPRS), Code-Division Multiple Access (CDMA), Wideband Code-Division Multiple Access (W-CDMA), wireless fidelity (Wi-Fi), IEEE 802.16 (WiMAX), 802.11, Bluetooth, Ultra Wide-Band, IrDA, etc.). Further, the device 120 can have hard-wired data transmission capability(ies) including, for example, wired Ethernet, USB, IEEE 1394, FireWire, power line data transmission and/or other wired communication link. Finally, the device 120 can be a device designed specifically for storage and transmission of device provisioning setting(s) and/or content (e.g., token).

The system 100 thus provides a mechanism for pushing device configuration and/or service indicator(s), for example, through a point-of-sale and/or point-of-service. Significantly, the system 100 utilizes NFC which facilitates selectivity to ensure that only the target device 120 is configured. The NFC-capable device 120 thus exposes its management interface(s) across the NFC channel 110. Additionally, device(s) 120 can be in factory-configured state without general connectivity (e.g., no WLAN or mobile data service yet).

Optionally, the NFC channel 110 can establish a secure and/or encrypted link over short distances (e.g., 1 to 2 centimeters, . . . ) between the device 120 and the server 130. For example, the encryption utilized can be a handshake (e.g., 4 way handshake) to establish a secure link on top of an "open" NFC channel associated with the NFC channel 110.

NFC technology permits wireless communication between devices across a narrow distance of 1 meter down to 2 centimeters or less. The air link and protocols are similar to those used by contactless smart cards and RFID, though there are differences in practice at multiple layers in the architecture.

Traditional Wireless Application Protocol (WAP) Push Service Indication/Service Loading uses the GSM Short-Message Service. Since SMS requires prior identification of the device, it prevents unsolicited push of service indicators or service loading. Use of SMS as a push data bearer assumes a device with a GSM radio, active service account with phone number assigned, and access by the server to the SMS-C (SMS Center) gateway. SMS is also a measured-rate service to all but the subscriber's mobile operator.

Existing device management systems utilize SMS, Infrared beaming (IrDA), Bluetooth, and/or HTTP. However, these systems have proven difficult to employ when applied to point-of-sale and/or point-of-service applications. Several of the difficulties include:

SMS requires a GSM radio and is mobile operator specific.

IrDA is line-of-sight—specific orientation of receiver is required.

IrDA often requires device setup to receive beams.

HTTP requires an active network connection to at least a WLAN. For this to be available, substantial configuration must have already occurred; security requirements for Internet connections, including firewall and NAT limitations, prevent server-activated sessions—end-user interaction most-likely required.

HTTP sessions often carry over the global Internet—discoverability and addressability of the correct local resource (e.g. this kiosk, not the one next door or one in the next county) is problematic.

Browser-based user-initiated sessions are problematic for small form-factor mobile devices.

Bluetooth is more complex and more power-intensive than a simple NFC/RFID transponder.

Bluetooth range is up to 30 feet which makes it less selective for close-range (e.g., kiosk-type) application(s).

Figure 2:
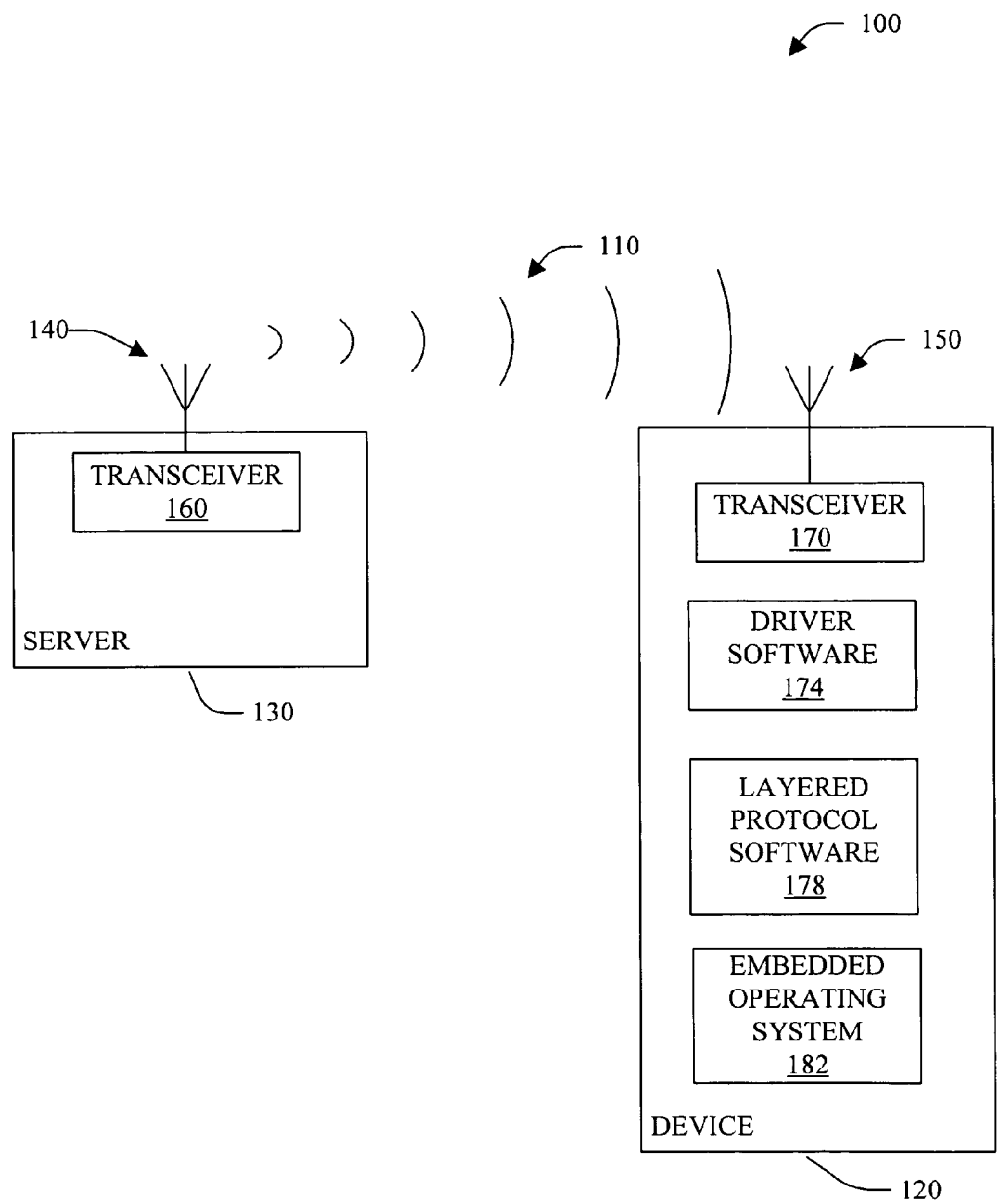
FIG. 2 is a block diagram of a device configuration system.

The system 100 overcomes the limitations of conventional wireless technologies (e.g., Bluetooth, Infrared beaming (IrDA) etc.) by employing Near-Field Communication. Referring briefly to FIG. 2, the server 130 and the device 120 can each include an antenna 140, 150 and a transceiver (including RF circuitry) 160, 170 (e.g., that comply with the ISO/IEC 18092:2004 standard). When the device 120 and the server 130 (e.g., NFC node) are brought within range, the server 130's data can be read by the device 120. Alternatively, the device 130 can act as a node while a server 120 discovers and reads/transmits data to the server 120. The device 120 can, optionally, further include driver software 174, and layered protocol software 178 which interfaces with the device embedded operating software 182.

Referring back to FIG. 1, as noted previously, the system 100 employs the NFC channel 110 as a device management and/or provisioning interface for mobile device(s) 120. NFC has several notable advantages as a bearer of over-the-air provisioning and/or device management when compared to conventional system(s). NFC has selectivity ranging from one meter down to a couple of centimeters and does not require prior knowledge of a specific device address. Further, NFC does not require a line of sight (as IrDA does), in fact, NFC can work through clothing and/or retail packaging. With NFC, device discovery and detection is through broadcast and response, but within short-range, unlike Bluetooth whose range is up to 30 feet. The NFC channel 110 is local, thus, the device 120 is not exposed to general Internet or intranet traffic. The NFC channel 110 employs an unlicensed frequency spectrum and thus is not burdened by access fees. Finally, NFC is suitable for (e.g., designed for) use in a production line environment. Accordingly, the fast association times and collision detection and resolution features of NFC are ideal for in-factory configuration and customization of device(s) 120.

An additional benefit of the NFC channel 110 is that it is designed for ultra-low power operation and can remain passive until in the presence of a reader. As noted above, NFC has local selectivity as it's range is limited to less than one meter. Additionally, NFC uses a low-cost device antenna system that can be integrated (e.g., directly) into paper and plastic packaging. The NFC channel 110 is further designed for low-complexity.

Active and Passive Modes

As noted previously, the NFC channel 110 can be employed in active and/or passive mode as a channel for provisioning and/or managing mobile device(s) 120. With respect to the passive mode, the server 130 as initiator generates an RF field which permits the NFC circuitry of the device 120 to power itself from the RF field and to accept small amounts of data without main power applied (e.g., without a battery or other power source). The passive mode can be used, for example, to provision device(s) 120 and/or extract device capability and description document(s) and/or device identification (such as a serial number) while power is not applied and/or a power source (e.g., battery) is removed. For example, with the device 120 in passive mode, the NFC channel 110 can be employed to trigger a power-on or wake to permit dispatch of an NFC event that occurs while the device 120 is in the "off" state.

With "active mode" (also referred to as "powered" or "non-passive"), the NFC circuitry appears to the embedded OS as another communication channel on which layered protocols can be exposed through existing service elements in the device 120. For example, NFC can be exposed as a physical network interface, a TCP/IP interface, OBEX endpoint, SOAP endpoint, SyncML client or server, FTP client or server, and/or other data communication protocol endpoint.

Provisioning of Mobile Device 120

The system 100 can employ the NFC channel 110 in the active and/or passive mode as a channel for provisioning the mobile device 120 (e.g., with content and/or setting(s)). For example, the system 100 can utilize the NFC channel 110, in combination with other standardized and/or proprietary service elements, to expose these communication endpoints through a "touch target" by simply aligning the device with another NFC-capable device (e.g., server 130) that supports compatible communication protocols.

In the un-powered or passive mode, provisioning files are received during the passive state and can be buffered. When power is applied, the buffer can be inspected and any valid and authorized content and/or setting(s) can be retrieved and applied to the device. For example, this content and related settings can take the form of a URL which points to the content (e.g., either in the device's ROM, the device's file system and/or somewhere external to the device such as the Internet). In another example, the content and related settings can take the form of a data archive package (e.g., a CAB, ZIP and/or JAR file).

Content over the NFC channel 110 can be in a standardized format such as, for example, Open Mobile Alliance (OMA) Client Provisioning, OMA Device Management Tree and Description Serialization (TNDS), OMA Device Management Notification Initiated Session, data sync protocol (SyncML) and/or in a proprietary format. Content can further be based on Simple Network Management Protocol (SNMP). Further, utilizing a push data format, the server 130 can provide for Service Indication/Service Loading over the NFC channel 110. Additionally, the device 120 can expose Universal Plug and Play (UPNP) protocols and device capability document(s) and/or a unique device identification code across the NFC channel 110.

Optionally, content can be signed for authorization and/or integrity purposes. Alternatively, content can carry no explicit guarantees of authenticity relying instead on other means for authentication and validation.

Accordingly, NFC can bring selectivity to augment other wireless technologies such as Bluetooth or WLAN which lack selectivity due to their range (e.g., in excess of 30 feet). As noted above, NFC is designed to operate in deployments at under one meter between base station (e.g., server 130) and device—with maximum ranges designed to as low as a several centimeters. For example, once a Bluetooth or WLAN link has been established, user intent to establish communication with a specific application becomes vague and confined to application-specific means. However, with the system 100, NFC can be used as the activating means by which a user expresses intent to establish a session while BT/WLAN continue and carry the payload data of the application session.

Figure 3:
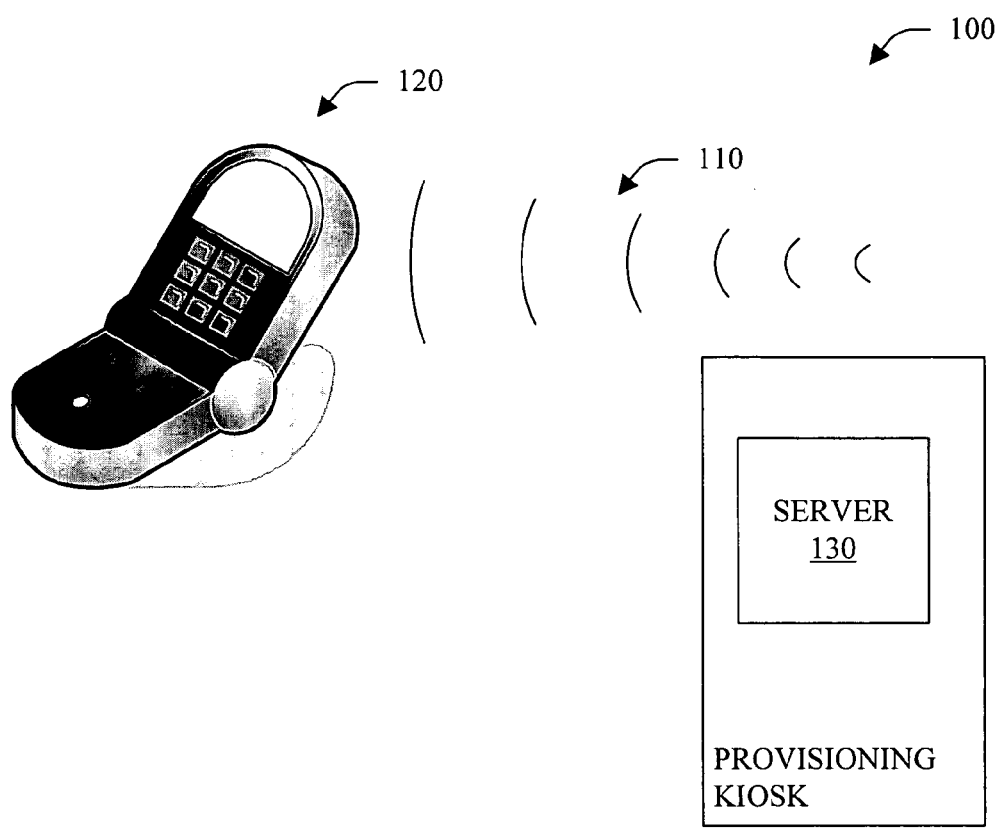
FIG. 3 is a block diagram of a device configuration system.

As illustrated in FIG. 3, with the system 100, the NFC channel 110 can be employed as a packet data session initiator, an application session initiator and/or a service availability and status indicator (e.g., service advertisement). Via the NFC channel 110, content can be provisioned, for example:

Delivery of ring-tone(s), screen art, application(s), Web bookmarks and/or user-interface elements such as menus and "themes".

Provisioning/activation/deactivation of user experience profiles or preferences (e.g., activate silent mode in a conference room or restaurant).

DRM (Digital Rights Management) license delivery and renewal for protected content. For example, as a second factor in DRM license fulfillment—that is, license to content only valid while in the presence of a specific NFC node.

Delivery of factory customization and configure-to-order on a per-unit basis in a production line environment.

Customization and configuration at retail point-of-sale or point-of-service.

It is to be appreciated that the system 100, the device 120, the server 130, the transceiver 160, 170, the driver software 174, the layered protocol software 178 and/or the embedded operating system 182 can be computer components as that term is defined herein.

Figure 4:
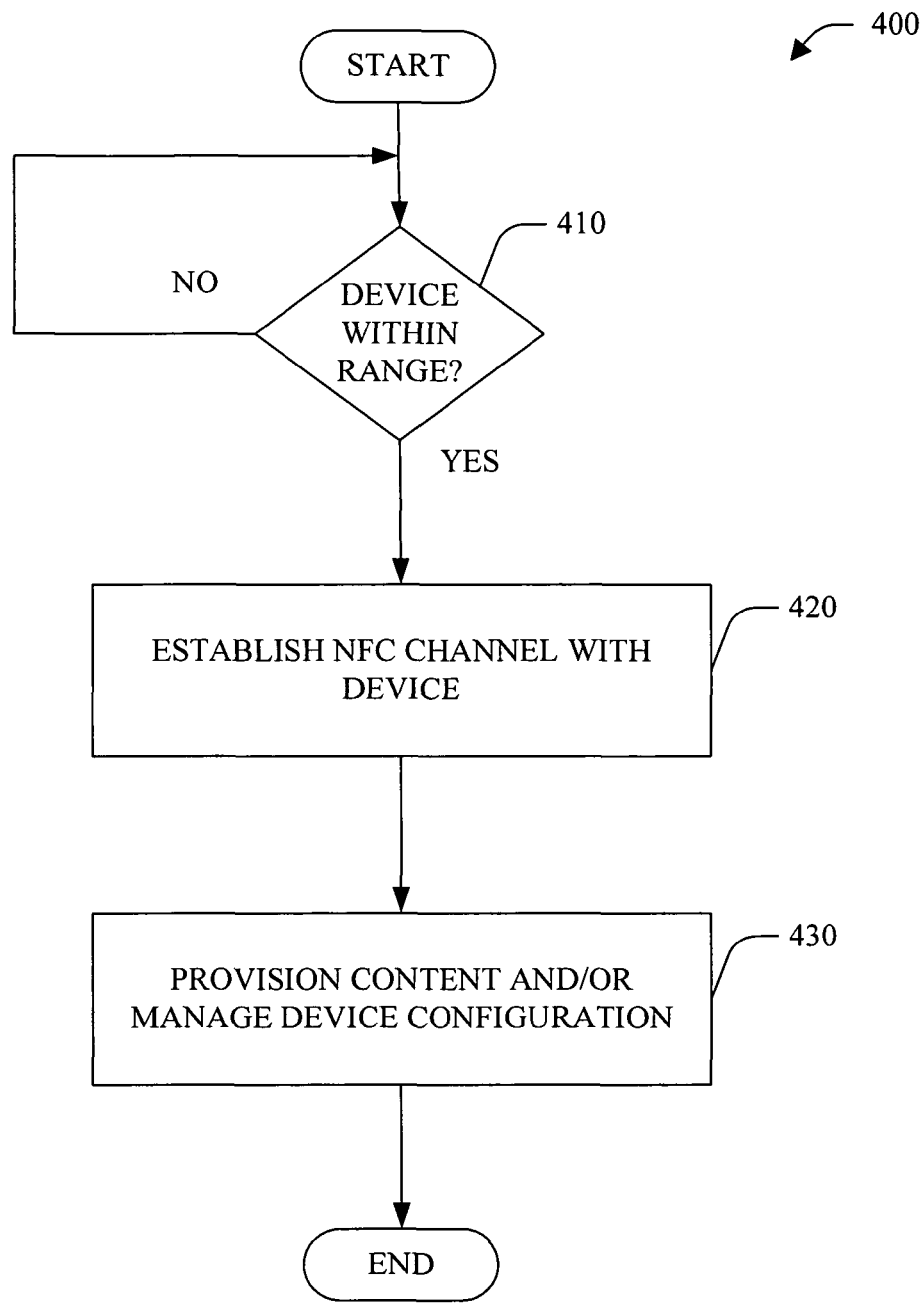
FIG. 4 is a flow chart of a method of provisioning and/or managing device configuration.
Figure 5:
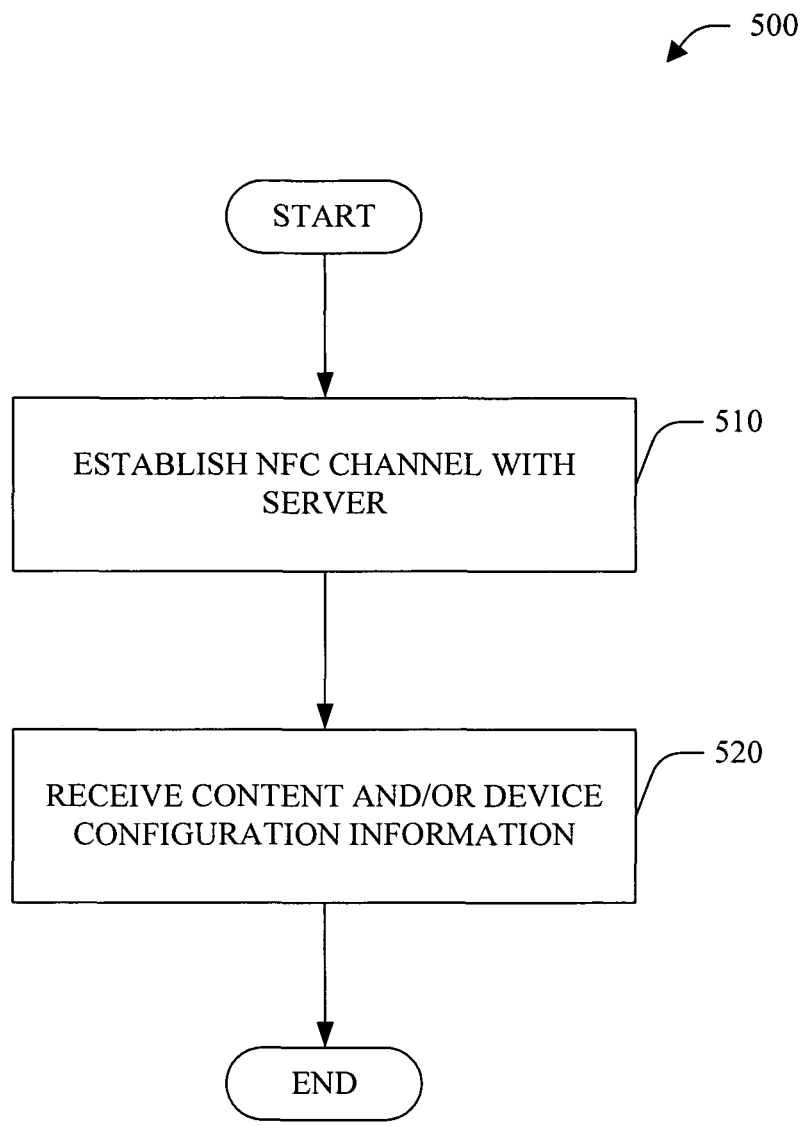
FIG. 5 is a flow chart of a method of provisioning and/or managing device configuration.
Figure 6:
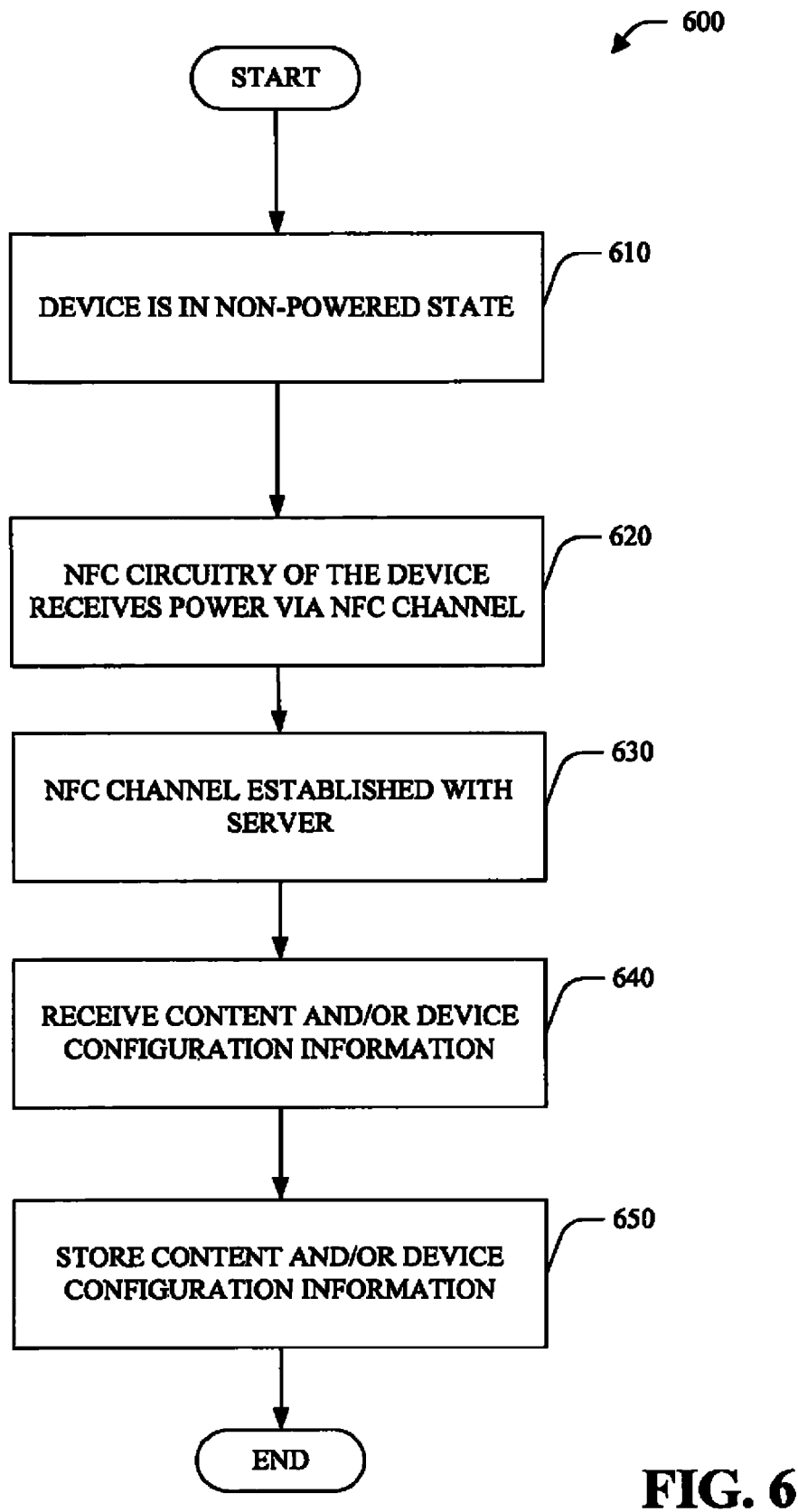
FIG. 6 is a flow chart of a method of provisioning and/or managing device configuration.

Turning briefly to FIGS. 4-6, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, a method of provisioning and/or managing device configuration 400 is illustrated. At 410, a determination is made as to whether a device is within range (e.g., of a server). If the determination at 410 is NO, processing continues at 410.

If the determination at 410 is YES, at 420, an NFC channel is established with the device. At 430, content is provisioned and/or device configuration is managed.

Next, turning to FIG. 5, a method of provisioning and/or managing device configuration 500 is illustrated. At 510, an NFC channel is established (e.g., with a server). At 520, content and/or device configuration information is received.

Referring to FIG. 6, a method of provisioning and/or managing device configuration 600 is illustrated. At 610, a device is in a non-powered state. At 620, NFC circuitry of the device receives power via an NFC channel.

At 630, the NFC channel is established with a server. At 640, the device receives content and/or device configuration information. At 650, the received content and/or device configuration information is stored, for example, in a buffer (e.g., for use by the device when powered). Thereafter, when the device is in a powered stated, the stored content and/or device configuration information can be retrieved and applied to the device.

Figure 7:
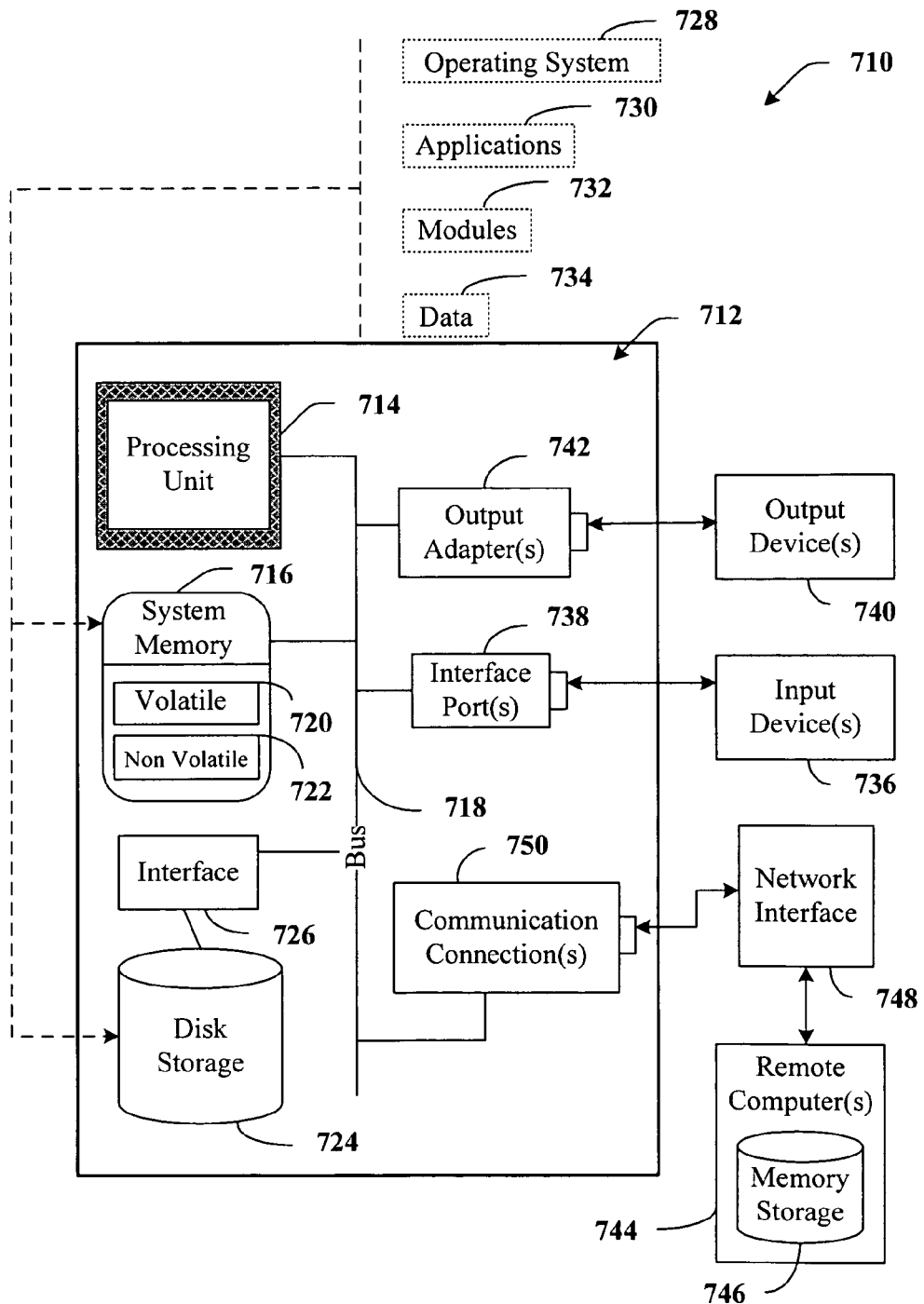
FIG. 7 illustrates an example operating environment.

In order to provide additional context for various aspects of the claimed subject matter, FIG. 7 and the following discussion are intended to provide a brief, general description of a suitable operating environment 710. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), IEEE 1394/Firewire, Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724 or non-volatile memory, acts to control and allocate resources of the computer system 712. System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, a Universal Serial Bus (USB) and an IEEE 1394/Firewire port. Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5, wireless LAN/IEEE 802.11 and the like. WAN technologies include, but are not limited to, point-to-point links, circuit switching networks like Integrated Services Digital Networks (ISDN) and variations thereon, packet switching networks, Digital Subscriber Lines (DSL), and wireless metropolitan area networks 802.16/Wi-MAX.

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device comprising:
    radio frequency circuitry and an antenna device, which facilitate communication between the computing device and a server over a near field communication channel having an operating range not exceeding about one meter, the near field communication channel used to augment an operation of another wireless communication beyond said operating range;
    a processor; and
    a memory coupled to the processor, the memory having stored thereon executable instructions that when executed by the processor cause the processor to effectuate operations comprising:
        receiving provisioning files that are buffered to the memory when the computing device is in a non-powered state;
        applying settings for authorized protected content based on the received provisioned files when the computing device is powered on;

receiving a license for the authorized protected content while in the near field communication channel operating range of a first near field communication channel node, and providing instructions to renew the received license for the authorized protected content based on the computing device being in the near field communication channel operating range of the first near field communication channel node.

2. The computing device of claim 1, wherein the computing device further receives configuration information pushed from a point of sale node over the near field communication channel.

3. The computing device of claim 2, further comprising a provisioning file sent over the near field communication channel based on at least one of Open Mobile Alliance Client Provisioning, Open Mobile Alliance Device Management based on SyncML protocol or data formats and Simple Network Management Protocol.

4. The computing device of claim 1, wherein when the computing device is in the non-powered state, the radio frequency circuitry is powered by energy from the near field communication channel provided by the server.

5. The computing device of claim 1, wherein the another wireless communication comprises at least one of mobile cellular data, third generation, General Packet Radio Service, Code-Division Multiple Access, Wideband Code-Division Multiple Access, wireless fidelity, IEEE 802.16, 802.11, Bluetooth, Ultra Wide-Band and Infrared beaming.

6. The computing device of claim 1, wherein the computing device possesses a hardwired data transmission capability based on at least one of wired Ethernet, USB, IEEE 1394, FireWire or power line data transmission.

7. The computing device of claim 1, wherein when the computing device is in the non-powered state, the computing device receives data pushed from the server over the near field communication channel according to a push data format to provide for at least one of service indication or service loading.

8. The computing device of claim 1, further comprising driver software and layered protocol software which interfaces with embedded operating software of the computing device.

9. The computing device of claim 1, wherein when the computing device is in a powered, active state, the radio frequency circuitry serves as a communication channel for an embedded operating system of the computing device on which a layered protocol is exposed.

10. The computing device of claim 9, wherein the communication channel comprises at least one of a physical network interface, a TCP/IP interface, an OBEX endpoint, a SOAP endpoint, a SyncML client, a SyncML server, an FTP client or an FTP server.

11. The computing device of claim 1, wherein the computing device comprises one of a cellular phone, a personal digital assistant, a handheld game console, a media player, or a token that receives and stores at least a provisioning setting or content.

12. The computing device of claim 1, wherein the computing device is further configured to send to the server, over the near field communication channel, device description data comprising a Universal Plug and Play capability document.

13. The computing device of claim 1, wherein the computing device is further configured to send to the server, over the near field communication channel, device description data comprising a unique device identification code.

14. The computing device of claim 1, wherein the memory has further executable instructions stored theron that when executed by the processor cause the processor to effectuate operations further comprising:

provisioning content or managing configuration of the computing device such that the computing device receives and buffers configuration information over said near field communication channel, while the device is in a non-powered state and upon power-up retrieves and applies the configuration information from the buffer.

15. The computing device of claim 1, wherein the another wireless communication uses at least one of a Bluetooth network or a wide area local area network (WLAN).

16. The computing device of claim 1, wherein the license comprises a digital rights management license.

17. The computing device of claim 1, wherein the computing device is configured to send to the server, over the near field communication channel, an indication of an intent to establish a session, and further configured to use the another wireless communication carrying payload data associated with said session.

* * * * *